United States Patent
Orth et al.

[15] 3,697,918
[45] Oct. 10, 1972

[54] SILICON DIAPHRAGM PRESSURE SENSOR HAVING IMPROVED CONFIGURATION OF INTEGRAL STRAIN GAGE ELEMENTS

[72] Inventors: Edward D. Orth, Boxford, Mass.; Alexander J. Yerman, Scotia, N.Y.

[73] Assignee: General Electric Company

[22] Filed: Aug. 3, 1971

[21] Appl. No.: 168,548

[52] U.S. Cl. ............ 338/3, 73/88.5 SD, 73/398 AR
[51] Int. Cl. ..................................................G01l 1/22
[58] Field of Search........338/2, 3, 4, 42; 73/88.5 SD, 73/398 AR; 317/235 M

[56] References Cited
UNITED STATES PATENTS 3,034,346  5/1962  Starr ..................... 338/3 UX
3,388,597  6/1968  Bargen et al. ......... 73/398 AR
3,537,319  11/1970  Yerman .................... 338/4 X Primary Examiner—C. L. Albritton
Attorney—William S. Wolfe et al.

[57] ABSTRACT

A monocrystalline silicon diaphragm pressure sensor has integral strain gage elements in the form of series-connected elongated strips arranged parallel to a preselected crystal axis. The configuration results in uniform penetration of the dopant so that the elements are better matched thermally when connected in a Wheatstone bridge type of measuring circuit.

6 Claims, 3 Drawing Figures

PATENTED OCT 10 1972

3,697,918

INVENTORS
EDWARD D. ORTH
ALEXANDER J. YERMAN
BY W.S.Wolfe
ATTORNEY

SILICON DIAPHRAGM PRESSURE SENSOR HAVING IMPROVED CONFIGURATION OF INTEGRAL STRAIN GAGE ELEMENTS

BACKGROUND OF THE INVENTION

This invention relates to monocrystalline silicon diaphragms with integral semiconductor strain gages for measuring pressure. More particularly, it relates to an improved configuration of the semiconductor strain gages to reduce the effects of ambient temperature changes on the output of the gage known as "temperature drift."

Pressure sensitive diaphragms of the piezoresistive type are known. Recent developments have produced superior diaphragms of the integral type wherein a flexible diaphragm is formed of a monocrystalline semiconductor such as silicon. The strain gage resistance elements are integrally formed on one side of the diaphragm by a diffusion of a dopant such as boron. Four resistance elements are arranged to form a Wheatstone bridge with the elements located on the diaphragm so that two are in tension and two in compression when the diaphragm flexes. This arrangement increases the sensitivity and linearity of the bridge output. One configuration of resistance elements on a silicon diaphragm is shown, for example, in U.S. Pat. No. 3,537,319 Yerman, issued Nov. 3, 1970 and assigned to the same assignee as the present invention.

Pressure transducers utilizing the silicon diaphragms as pressure sensors are subject to a measurement error known as "temperature drift." This is caused by resistance changes of the bridge elements in response to ambient temperature changes. To minimize this error, it is desirable that the resistance elements be thermally matched as closely as possible so that all temperature-induced resistance changes will be proportional and have no effect on the bridge output. Heretofore, difficulties have been encountered in thermal matching of the resistance elements so as to meet the required specification limits for temperature drift. Further, temperature drift may be caused by any mismatch between the coefficients of expansion of the diaphragm and its support.

Accordingly, it is an object of this invention to provide a pressure-sensitive silicon diaphragm of the above-mentioned type having an improved configuration of resistance elements that reduces measurement error caused by temperature drift.

Another object of the invention is to provide an improved silicon diaphragm in which the resistance elements and interconnect areas are integrally formed by diffusion along with alternate electrical connections designed to facilitate initial balancing of the bridge resistance elements.

Further objects and advantages of the invention will become apparent as the following description proceeds.

SUMMARY OF THE INVENTION

Briefly, in accordance with the invention, the resistance elements diffused into the silicon diaphragm are formed of a plurality of elongated strips arranged parallel to a preselected crystallographic axis of the diaphragm. They are symmetrically arranged on the strain-sensitive area of the diaphragm in four sections with two of the sections in an area where they are subject to tensile strain and the other two in an area where they are subject to compressive strain. Integrally formed interconnect areas connect all of the resistance elements and sections in series circuit relation with the sections subject to tensile and compressive strains alternately arranged in the series circuit. Because all of the resistance elements are parallel to a crystal axis of the diaphragm, the penetration and density of the diffused dopant, which vary with direction in the crystal diaphragm, are uniform. As a result, the temperature coefficients of resistance and strain sensitivity of the resistance elements are correspondingly uniform whereby the resistance elements are more easily thermally matched, thus reducing temperature drift.

For a better understanding of the invention, reference should be made to the following detailed description taken in connection with the accompanying drawings.

DETAILED DESCRIPTION

Figure 1:
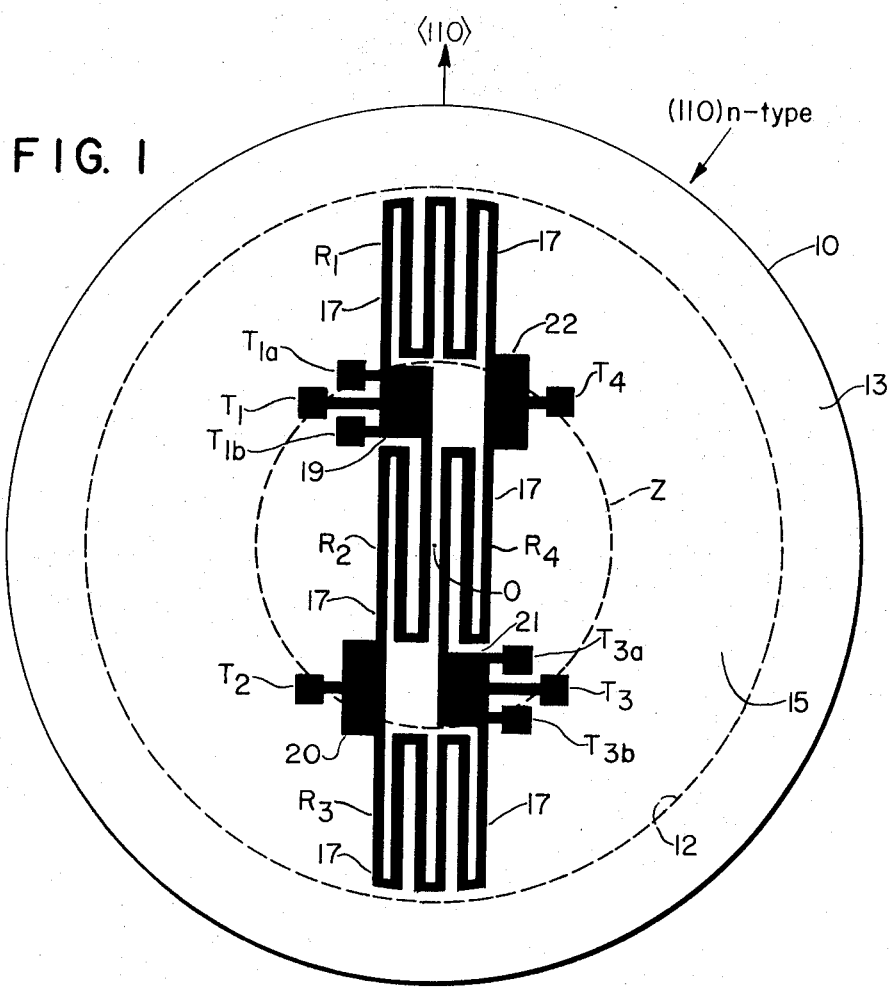
FIG. 1 is a plane view of the pressure-sensitive diaphragm showing the configuration of the resistance elements in accordance with the invention.
Figure 2:
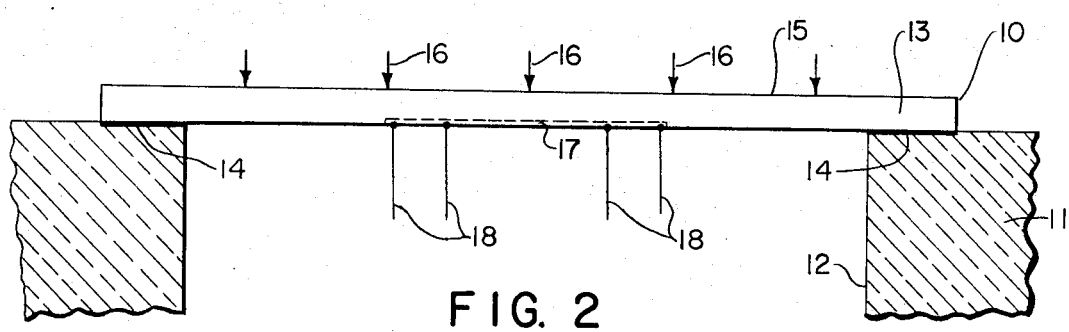
FIG. 2 is a side view of the diaphragm showing how it is mounted on a support.

Referring to the drawings, there is disclosed a pressure-sensitive diaphragm 10 formed of a semiconductor material such as silicon. The diaphragm is mounted on the end of a support 11 in the form of an elongated glass cylinder having an axial bore 12. An outer restrained area 13 of the diaphragm is integrally bonded to the support in the area 14 by an anodic bonding process such as disclosed in U.S. Pat. No. 3,397,278 Pomerantz, granted Aug. 13, 1968. The glass support 11 is selected to have a coefficient of expansion approximately the same as that of the silicon diaphragm to minimize thermal stresses in the diaphragm tending to produce measurement error.

The diaphragm has a central active area 15 which overlies the bore 12 and which is subjected to a pressure to be measured indicated by arrows 16 causing the diaphragm to flex. Strain gage resistance elements 17 integrally formed on one side of the diaphragm and arranged in a bridge configuration are electrically connected to a measuring circuit by conductors 18 passing outwardly through bore 12. The diaphragm mounting arrangement described above is similar to that disclosed and claimed in a copending application of Edward D. Orth and Alexander J. Yerman, Ser. No. 162,278 filed Aug. 2, 1971 and assigned to the same assignee as the present invention.

According to the present invention, the strain gage elements have a novel configuration and arrangement which results in superior performance of the diaphragm as a pressure sensor. This will now be described in detail.

The monocrystalline diaphragm 10 is a thin slice of n-type semiconductor material cut from a single crystal of silicon so as to have a (110) crystallographic orientation. The strain gage piezoresistive elements 17 are p- type silicon being formed on one surface of the diaphragm by diffusion of a suitable dopant such as boron or by selective epitaxial growth. To secure the desired configuration of the elements 17, masking and etching techniques are used which are well known in the semiconductor art.

The configuration of the strain gage resistance elements and the integral interconnect areas which form a Wheatstone bridge circuit are shown in FIG. 1 of the drawing to which reference will now be made. The resistance elements 17 are formed of a plurality of folded, elongated strips arranged parallel to a preselected crystallographic axis of the diaphragm. Preferably, this is the (110) axis for good strain sensitivity in the direction of the longitudinal axis of the resistance elements with minimum sensitivity in the direction of the lateral axis.

The resistance elements are further arranged on the active area of the diaphragm in four sections designated as $R_1$, $R_2$, $R_3$ and $R_4$. The sections $R_1$ and $R_3$ are located on the outer portions of the diaphragm beyond a zero radial-stress boundary Z. In this area, the resistance elements are subjected to compression when the diaphragm flexes in response to a pressure stress. The sections $R_2$ and $R_4$ are located on the inner portion of the diaphragm within the zero radial-stress boundary Z. In this area, the resistance elements are subjected to tension when the diaphragm flexes in response to pressure stress. It will be noted also that resistance sections $R_2$ and $R_4$ extend symmetrically on both sides of the geometric center O of the diaphgram.

Figure 3:
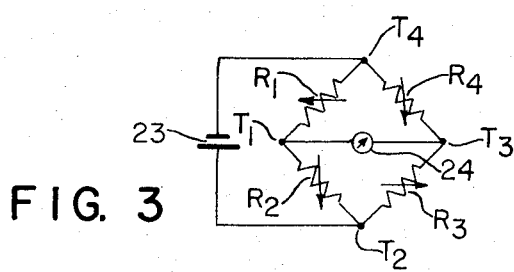
FIG. 3 is a connection diagram showing how the resistance elements are connected in a Wheatstone bridge measuring circuit.

A plurality of interconnect areas 19, 20, 21, and 22 are integrally formed in the diaphragm by diffusion in the same manner as the resistance elements. It will be noted that these interconnect areas function to connect the resistance sections in series circuit relation with the sections $R_1$ and $R_3$ subject to compressive stress alternately connected in the series circuit with the sections $R_2$ and $R_4$ which are subject to the tensile strains. This arrangement with sections having resistance changes of opposite polarity alternately connected increases the sensitivity of the Wheatstone bridge measuring circuit illustrated schematically in FIG. 3. Preferably, the interconnect areas are wider than the elements 17 so as to have a low resistance with respect to that of the sensor elements 17 which are used for pressure measurement.

Electrical connections from wires 18 to the junction points of the resistance bridge are made through contact pads $T_1$, $T_2$, $T_3$, and $T_4$ which are integrally formed and extend from the interconnect areas 19, 20, 21 and 22. In order to facilitate initial balancing of the bridge, interconnect area 19 is provided with alternate connection points $T_{1a}$ and $T_{1b}$ at different resistance locations on the interconnect area. Similarly, the diagonally opposite interconnect area 21 has alternate connections $T_{3a}$ and $T_{3b}$ at different resistance locations on the interconnect area. With a suitable source of potential 23 applied across the bridge terminals $T_2$ and $T_4$, different connections may be tried to obtain a minimal reading of a meter 24 connected across terminals $T_1$ and $T_3$ or alternate connections $T_{1a}$, $T_{1b}$ on one side and $T_{3a}$, $T_{3b}$ on the other. The bridge should be balanced as indicated by the minimal reading of meter 24 when there is no pressure-induced flexing or strain of the diaphragm. Wires 18 are then permanently connected to the terminals giving the best bridge balance for the zero pressure condition.

In order to avoid measurement error, the strain gage resistance elements should be matched thermally so that no bridge unbalance occurs caused by resistance changes due to temperature. This condition is obtained only when the resistance elements have the same temperature coefficient of resistance and the same temperature coefficient of gage factor or strain sensitivity. Both of these factors are affected by the penetration of the dopant in the diffusion process. It has been found that the diffusion rate varies in different directions in the crystal with respect to the crystal axes. Therefore, in prior art strain gage configurations, where the resistance elements extend in different crystal directions, variables in the resistance characteristics of the elements are introduced which cannot be eliminated by the time and temperature controls of the diffusion process. With the configuration of the resistance elements according to the present invention wherein all resistance elements are formed of elongated strips extending in the same crystal direction, this variable is eliminated and more uniform dopant penetration is achieved. This orientation, coupled with the low resistance integral interconnect areas, makes possible a much higher degree of thermal matching of the resistance elements than has been possible heretofore with a resulting reduction of measurement error. Thus, using this configuration, it has been possible to produce pressure sensors of the silicon strain gage type having temperature drifts less than 0.1 percent of full scale per 100°F over the entire temperature range which for many industrial applications is typically room temperature ± 100° F.

A further factor in the design giving reduced temperature drift is that the resistance bridge is insensitive to strains caused by any slight mismatch in the coefficients of expansion of the diaphragm 10 and the support 11. Any such mismatch will cause strains in the diaphragm which extend radially with respect to the geometric center O. Since the resistance sections $R_2$ and $R_4$ extend in the same direction with the same strain sensitivity and since they are symmetrically disposed with respect to the center O, any resistance changes caused by thermal strains on the diaphragm are all proportional and hence do not unbalance the bridge to produce measurement error.

While there has been shown what is presently considered to be a preferred embodiment of the invention, it will be apparent to those skilled in the art that various changes and modifications may be made therein without departing from the spirit and scope of the invention.

What is claimed as new and desired to be secured by Letters Patent of the United States is:

1. A piezoresistive strain gage comprising:
   a. a diaphragm formed of a monocrystalline material having a restrained outer portion and a strain-sensing inner portion adapted to be subjected to a pressure to be measured;
   b. semiconductor strain gage elements formed integrally on one surface of said diaphragm by diffusion, said strain gage elements being in the form of a plurality of elongated strips arranged parallel to a preselected crystallographic axis of said diaphragm and further arranged on the strain-sensitive area of the diaphragm in four sections with two of the sections in an area where they are subject to tensile strain and the other two sections in an area where they are subject to compressive strain;

c. a plurality of interconnect areas also formed integrally on said surface of the diaphragm by diffusion in locations electrically to connect all of the strain gage elements and sections in series circuit relation with the sections subject to tensile and compressive strains alternately arranged in the series circuit; and d. circuit connecting means for making electrical connections to the interconnect areas extending between the four sections of the strain gage elements to form a Wheatstone bridge type of measuring circuit.

2. A piezoresistive strain gage as set forth in claim 1 wherein the diaphragm is formed of silicon.

3. A piezoresistive strain gage as set forth in claim 1 wherein the elongated strips forming two of the sections extend symmetrically on both sides of the geometric center of the diaphragm.

4. A piezoresistive strain gage as set forth in claim 1 wherein the circuit connecting means includes alternate connections at different resistance locations on the interconnect areas to facilitate initial balancing of the bridge.

5. A piezoresistive strain gage as set forth in claim 1 wherein the diaphragm is formed of n-type silicon and the semiconductor strain gage elements are formed of p-type silicon.

6. A piezoresistive strain gage as set forth in claim 5 wherein the diaphragm is oriented in the (110) plane and the strain gage elements are parallel to the (110) axis.

* * * * *